United States Patent [19]

Smirl

[11] 3,773,153
[45] Nov. 20, 1973

[54] ROTOR FOR CLUTCH OR BRAKE
[75] Inventor: Richard L. Smirl, Arlington Heights, Ill.
[73] Assignee: Borg-Warner Corporation, Chicago, Ill.
[22] Filed: Jan. 26, 1972
[21] Appl. No.: 220,784

[52] U.S. Cl. 188/218 XL, 188/264 AA, 192/107 R, 192/113 A
[51] Int. Cl. ............................................. F16d 65/12
[58] Field of Search ................. 188/218 XL, 264 A, 188/264 AA, 71.6, 73.2; 192/107 R, 113 A

[56] References Cited
UNITED STATES PATENTS
2,197,232  4/1940  Wood .......................... 188/264 A X
3,486,218  12/1969  Buyze ..................... 188/218 X L X
3,623,579  11/1971  Hendrickson et al. ......... 188/71.6 X
2,753,959  7/1956  Johnson ....................... 188/218 X L
2,358,134  9/1944  Tack ........................... 188/264 A X Primary Examiner—George E. A. Halvosa
Attorney—Donald W. Banner et al.

[57] ABSTRACT

A rotor for use in disc brakes or clutches adapted to be cooled by a fluid passing between and across spaced friction surfaces which rotor includes a pair of spaced apart, annular discs joined together for conjoint rotation and a fin assembly disposed between the discs formed from a strip of relatively thin material folded to define a plurality of adjacent folds disposed in an annular configuration which fin assembly acts to promote and turbulize the flow of fluid between the annular discs and also acts in a heat exchange relationship between the annular discs and the fluid.

7 Claims, 6 Drawing Figures

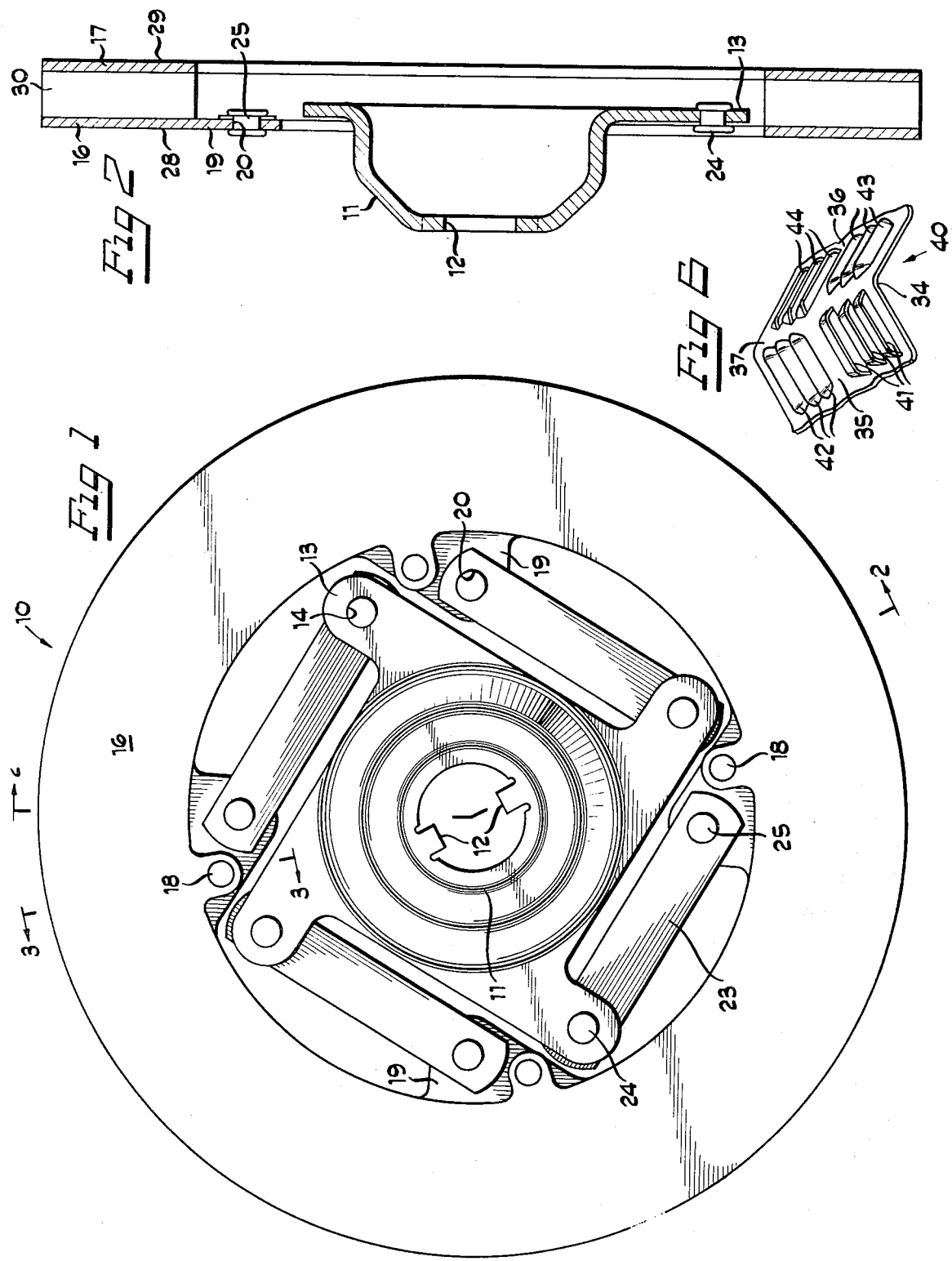

PATENTED NOV 20 1973 3,773,153

ROTOR FOR CLUTCH OR BRAKE

BACKGROUND OF THE INVENTION

This invention relates to a rotor. More particularly, it relates to a fluid cooled rotor adapted for use in disc brakes or clutches.

Cast brake rotors cored to provide internal air passages for heat dissipation are well known in the art. These rotors include a pair of spaced apart disc members joined together by integral rigid ribs. Such a construction generally provides about double the surface area available for heat dissipation compared to a solid rotor.

This type of construction has proved somewhat satisfactory for limited duration slip applications but for prolonged or continuous slip, destructively high temperatures and excessive friction pad wear result.

Several other approaches have been tried to increase heat dissipation including the attachment of blower wheels or other flow deflecting means to the external surface of the discs. None of these designs, however, have proved entirely satisfactory for rotors subjected to prolonged slip applications.

SUMMARY OF THE INVENTION

The present invention provides a rotor adapted for use in either disc brakes or clutches including a fin assembly disposed between a pair of spaced apart annular discs. The fin assembly is formed from a flat strip of relatively thin material, preferably possessing a high degree of thermal conductivity. The strip is folded to define a plurality of adjacent folds arranged in an annulus. The fin assembly is in contact with the annular discs and preferably bonded thereto and distributes the heat generated in the discs across its entire surface area. The fin assembly is formed and arranged to promote and turbulize the flow of fluid, generally air, across the heat distributing surface to substantially increase heat dissipation.

The present invention provides a rotor having increased resiliency to promote greater surface contact between the friction discs and the disc engaging members. The increased resiliency also permits a greater degree of surface contact between the fin assembly and the annular discs during bonding to insure intimate contact between each fin and the plates. The present invention also provides a rotor having an exposed surface area available for heat distribution, many times the area of prior art rotors. The present invention further provides a rotor in which fluid flow across the heat distributing surfaces is greatly enhanced.

BRIEF DESCRIPTION OF THE DRAWINGS

FIG. 1 is a front view of a rotor showing the principles of the present invention.

FIG. 2 is a side view taken in section along the lines 2—2 of FIG. 1.

FIG. 6 is a perspective view showing a segment of the fin assembly in an expanded condition.

DESCRIPTION OF THE PREFERRED EMBODIMENT

Figure 3:
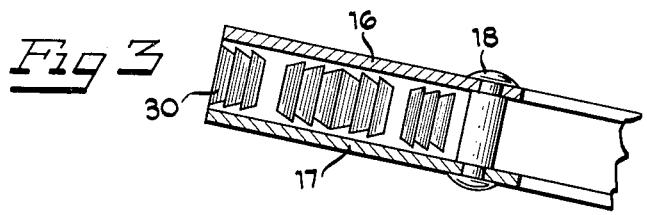
FIG. 3 is a side view partially in section taken along the lines 3—3 of FIG. 1.

Referring now to FIG. 1, there is shown a rotor, generally designated by the numeral 10, adapted for use with either disc brakes or clutches. The rotor of the present invention was specifically designed to be used as a component of a rotary clutch for use in a speed limiting accessory drive, shown and described in co-pending application, Ser. No. 220,978 of common assignee.

The rotor 10 includes a hub 11 adapted to be connected to a rotary driving member by means of a pair of tongues 12, designed to engage a keyway of a driving shaft, not shown. The hub 11 also includes a plurality of radially extending mounting ears 13 defining apertures 14.

As best seen in FIG. 2, the rotor 10 includes a pair of spaced apart annular discs 16 and 17. The discs are joined together for conjoint rotation by connector means 18, shown in FIG. 3 as rivets or spacers. The connecting means 18 may also function as spacers which act to resist any compressive load tending to urge the discs together. At least one of the annular discs, here shown in 16, is provided with radially inwardly extending flange portions 19, each of which define a mounting hole 20. The hub 11 is connected to the disc 16 by means of a plurality of straps 23 which extend between the mounting ears 13 and the mounting flanges 19. The straps are fastened at each end by means of rivets 24 and 25 or any other suitable fastening means.

Figure 4:
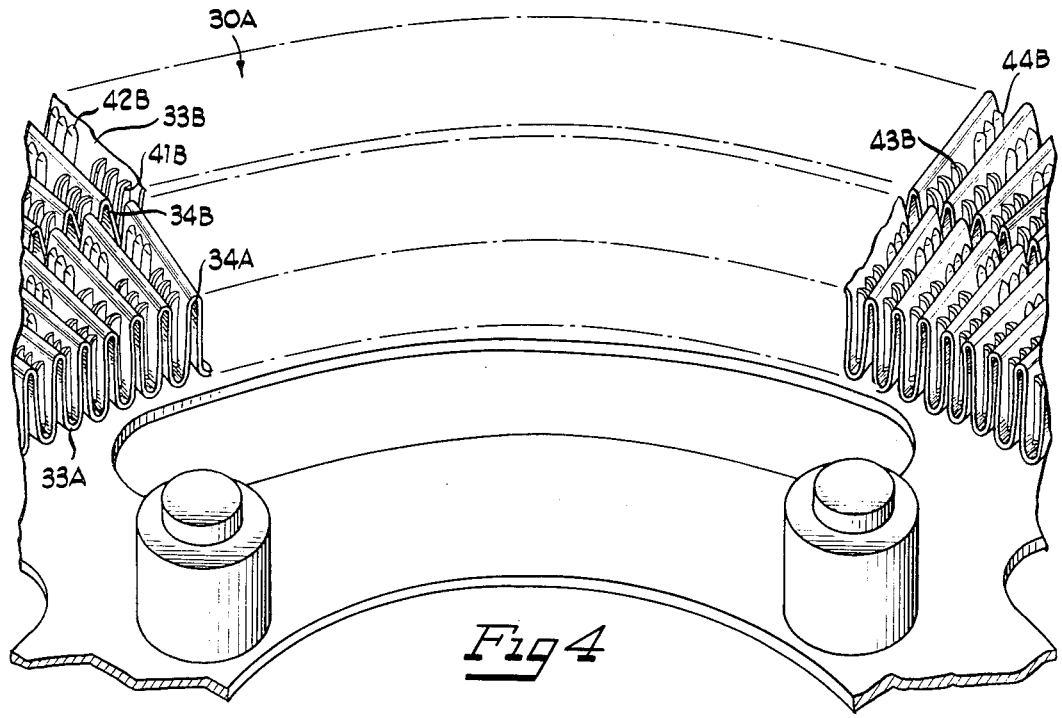
FIG. 4 is a perspective view showing a segment of an alternative embodiment of the rotor of the present invention.
Figure 5:
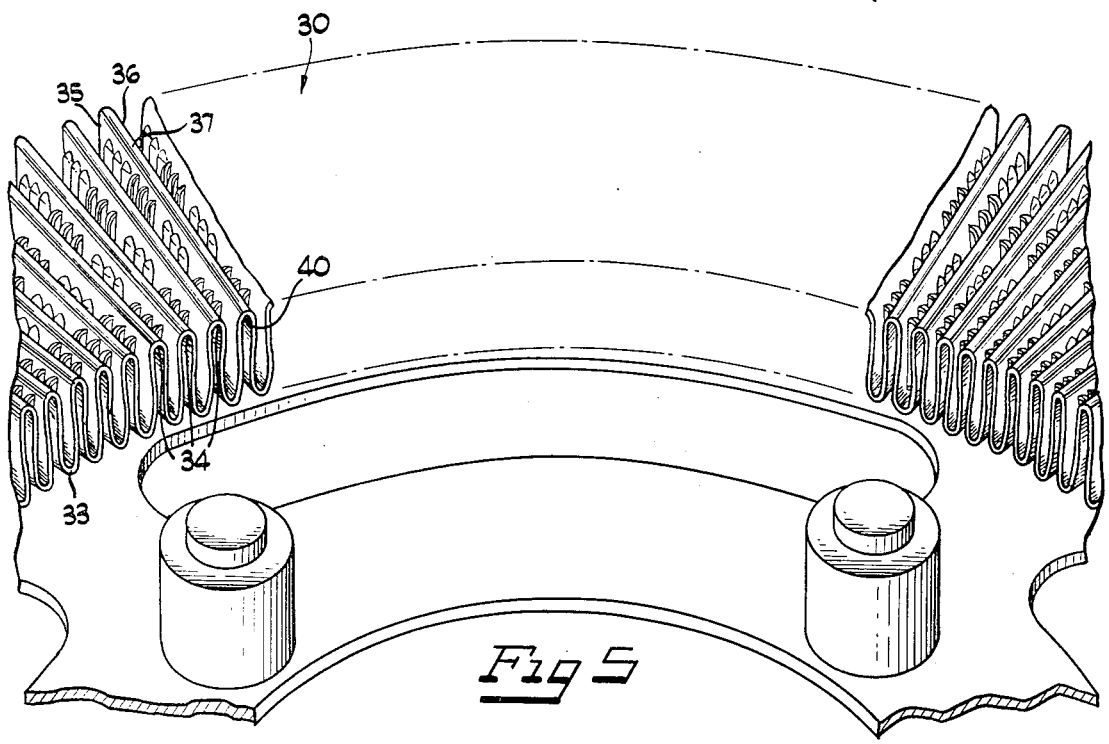
FIG. 5 is a perspective view showing a segment of the rotor of an alternate embodiment of the present invention.

The links 23 or straps are preferably formed of relatively thin metal to allow for axial deflection to accomodate the wear of the friction material in fixed pad assemblies. For floating pad assemblies, however, the hub may instead be mounted rigidly with respect to the discs 16 and 17 as shown in FIGS. 4 and 5. The hub 11 is thus connected to at least one of the discs, here shown as 16, for the transmission of torque thereto, which disc in turn transmits torque to the disc 17 by means of the connecting means 18.

The disc 16 includes a friction surface 28 on one face thereof and the disc 17 includes a friction surface 29 on one face thereof. The friction surfaces 28 and 29 are adapted to be engaged by a friction material such as a friction pad in a disc brake assembly or a corresponding friction member in a friction clutch. The friction surfaces 28 and 29 may be further characterized as having properties compatible with the friction material employed by the engaging member. The friction surfaces may be made of a high carbon, pre-tempered steel stock, such as, for instance, SAE 1095. The friction surfaces also may be made from a mild steel, ranging from SAE 1020 to SAE 1025, and surface hardened such as, by gas carburization or cyaniding for an even harder surface. However, when the friction material has sufficient resiliency and when unit pressures are not unduly high friction surfaces of soft steel or soft aluminum have proved entirely adequate.

A fin assembly 30 is shown disposed between the discs 16 and 17. As best seen in FIG. 5, the fin assembly comprises a strip 33 of relatively thin, heat conductive material folded to define a plurality of adjacent folds 34 arranged in an annular configuration, corresponding to that of the disc member 16 on which it rests. By virtue of the annular arrangement of the folded strip 33, each fold 34 extends along a radius drawn from the center of the annulus.

Each fold 34 includes a pair of radially extending planar surfaces 35 and 36 joined together along a common line 37. The structure of a typical fold is best shown in FIG. 6, which shows a single fold 34 which has been partially unfolded and flattened out for purposes of illustration. Between each pair of planar surfaces 35 and 36 is defined a radially extending channel 40 extending the length of the fold.

Each fold 34 includes a first set of louvres 41 extending from the planar surface 35 and positioned so as to direct air into the channel 30 when the rotor and fin assembly are rotated. A second set of louvres 42 is shown extending from the planar surface 35 and adapted to direct air from the channel 40 upon rotation of the fin assembly. A third set of louvres 43 is shown extending from the planar surface 36, adapted to direct air from the channel 40 upon rotation of the fin assembly. A fourth set of louvres 44 is shown extending from the planar surface 36, adapted to direct air into the channel 40 upon rotation of the fin assembly.

The strip 33 which is folded to define the fin assembly is preferably comprised of a thin material having high thermal conductivity. Copper or aluminum in thicknesses of from about 0.004 inch to about 0.008 inch is recommended for maximum thermal conductivity with a given rotor size. If maximum conductivity is not necessary and it becomes desirable to use a larger rotor, steel fins may be used of somewhat heavier gauge, from about 0.010 inch to about 0.015 inch. This will result in a somewhat higher operating temperature at the friction surfaces.

FIG. 4 shows an alternate embodiment of a fin assembly 30A which comprises a pair of strips 33A and 33B. The strip 33B contains a greater number of total folds than the strip 33A due to the greater perimeter available at the outside diameter of the rotor compared to its inside diameter. This permits an increase in heat transfer surface area compared to the single strip configuration of FIG. 5. As a result, some of the adjacent folds 34A of the strip 33A are staggered with respect to the folds 34B of the strip 33B. The result is a somewhat greater degree of turbulence in the air passing through the fin assembly.

Any number or shape of louvres may be used and their relative positioning with respect to other sets of louvres may be arranged in any desired configuration so as to maximize turbulence and heat dissipation of the fin assembly.

During assembly of the rotor, the fin assembly 30 is placed between the discs 16 and 17 and attached to the dics by any of a number of methods such as, for example, bonding. If the discs 16 and 17 are made of a low silicon aluminum alloy and the strips are of nearly pure aluminum, a eutectic aluminum brazing material (about 10 percent silicon) may be used to braze the fin assembly to the discs. Alternatively, if the discs are made of high carbon steel, a copper or steel fin assembly may be affixed to the discs by a soldering process using a high lead content solder at temperatures of from about 550° F to 650° F, without softening the steel or warping the assembly.

The operation of the preferred embodiment in summary is as follows. The hub member 11 is affixed to a rotary driving member such as a shaft, not shown, by inserting the tongues 12 into a keyway milled on the shaft. Upon rotation of the driving shaft, torque is transmitted from the hub 11 to the disc 16 by means of straps 23 connected between the mounting ears 13 of the hub 11 and the mounting flanges 19 of the disc 16. Torque is thus transmitted from the hub 11 to rotate the disc 16. The disc 16, by virtue of connecting means 18, rotates the disc 17. The connecting means 18 thus transmit the drive between discs 16 and 17 and relieves the thin material of the fin assembly from compression loads.

As the friction surfaces, 28 and 29 are engaged by friction material, either in the form of friction pads as in a disc brake environment, or equivalent friction members in a friction clutch assembly, substantial amounts of heat are generated due to the relative slippage between the friction material and the friction surfaces. The fin assembly 30 by reason of its high thermal conductivity absorbs a major portion of the heat from the friction surfaces 28 and 29 and distributes the same across its entire surface area.

Upon rotation of the discs 16 and 17 the fin assembly 30 is also rotated by virtue of its connection to the discs 16 and 17. As a result of the radial arrangement of the folds 34 and channels 40, a blower action is promoted tending to direct air from the radial inner extent of the fin assembly to the radial outer extent. The arrangement of the various sets of louvres tend to promote a turbulent flow across the fin assembly and increase the heat dissipation of the rotor.

When the fin assembly is rotated in a non-liquid environment, air is generally the cooling fluid caused to flow across its surface. Alternatively, if the rotor is in a liquid cooled environment, liquid such as oil is caused to flow across the fin assembly for heat dissipation.

The fin assembly 30, by virtue of the particular structural arrangement disclosed, provides a greatly increased surface area for distributing the heat generated at the friction surfaces and promotes the flow and turbulence of cooling fluid passing over the heat distributing material 33. The positioning of the fin assembly 30 between the discs 16 and 17 also provides for increased resiliency of the discs upon contact with the engaging friction members. This provides a greater degree of surface contact between the friction engaging surfaces and the friction surfaces 28 and 29.

Thus, it has been shown that the present invention provides a rotor adapted for use in either disc brakes or clutches which has substantially enhanced heat dissipation characteristics due to the increase of exposed surface area available for heat distribution and a structural arrangement which promotes a turbulent fluid flow across the heat distributing surfaces.

Various of the features of the invention have been particularly shown and described. However, it should be obvious to one skilled in the art that various modifications may be made therein without departing from the scope of the invention.

What is claimed is:

1. An annular friction member for a brake or clutch comprising a pair of spaced apart annular discs; a fin assembly disposed between said discs formed from a strip of relatively thin material folded to define a plurality of adjacent folds disposed in an annular configuration, each fold including a pair of planar surfaces joined together along a common line and a radially extending channel defined between said planar surfaces; connecting means independent of said fin assembly disposed between said discs joining said discs for conjoint rotation and adapted to space said discs apart thereby resisting compressive loads tending to urge said discs together; and a plurality of louvres extending substantially normal to and between said discs and formed integral with and extending from at least some of said planar surfaces to provide openings therein, including a first set of louvres extending from one of said planar surfaces and inclined in one direction to direct air into said channel defined between said planar surfaces and a second set of louvres extending from one of said planar surfaces and inclined in the opposite direction to direct air from said channel defined between said planar surfaces.

2. An annular friction member as in claim 1 in which said fin assembly is attached to each of said discs so as to conduct heat therebetween.

3. An annular friction member as in claim 1 in which said louvres are formed integral with and extend outward from each planar surface of the pairs of surfaces and are inclined in each direction on each surface so as to direct air into and from the channel defined between each pair of planar surfaces.

4. An annular friction member as in claim 1 including a hub member attached to at least one of said discs adapted to be connected to a rotary driving member and to transmit torque to said discs.

5. An annular friction member as in claim 4 in which said hub member is attached to said disc member by means of a plurality of axially flexible straps.

6. An annular friction member as in claim 1 in which said fin assembly is formed from a plurality of strips of relatively thin material of successively increasing length, each strip folded to define a plurality of adjacent folds, each strip disposed in an annular configuration, adjacent strips being concentric and having successively increasing numbers of folds.

7. An annular friction member as in claim 6 in which some of said adjacent folds of one of said strips are staggered with respect to some of said adjacent folds of said adjacent strip.

* * * * *